US011507292B2

(12) United States Patent
Butcher et al.

(10) Patent No.: US 11,507,292 B2
(45) Date of Patent: Nov. 22, 2022

(54) SYSTEM AND METHOD TO UTILIZE A COMPOSITE BLOCK OF DATA DURING COMPRESSION OF DATA BLOCKS OF FIXED SIZE

(71) Applicant: DELL PRODUCTS, LP, Round Rock, TX (US)

(72) Inventors: Andrew Butcher, Cedar Park, TX (US); Shyamkumar Iyer, Cedar Park, TX (US); Glen Sescila, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 17/071,188

(22) Filed: Oct. 15, 2020

(65) Prior Publication Data

US 2022/0121359 A1    Apr. 21, 2022

(51) Int. Cl.
*G06F 12/00* (2006.01)
*G06F 3/06* (2006.01)
*G06F 9/30* (2018.01)

(52) U.S. Cl.
CPC ............ *G06F 3/064* (2013.01); *G06F 3/0608* (2013.01); *G06F 3/0659* (2013.01); *G06F 3/0673* (2013.01); *G06F 9/30047* (2013.01)

(58) Field of Classification Search
CPC ...... G06F 3/064; G06F 3/0608; G06F 3/0659; G06F 3/0673; G06F 9/30047
See application file for complete search history.

(56) References Cited

U.S. PATENT DOCUMENTS

| 9,652,408 B2 | 5/2017 | Cherian et al. |
| 10,275,162 B2 | 4/2019 | Kan et al. |
| 10,929,160 B1* | 2/2021 | Mateev ................. G06F 9/4552 |
| 2003/0084263 A1* | 5/2003 | Knippel ................ G06F 12/023 711/170 |
| 2016/0359760 A1* | 12/2016 | Vishnyakov ........ H04L 47/2483 |

* cited by examiner

*Primary Examiner* — Daniel D Tsui
(74) *Attorney, Agent, or Firm* — Larson Newman, LLP

(57) ABSTRACT

An information handling system includes a processor that detects a cache flush request of a memory device within the processor, and identifies multiple blocks of data within an address space associated with the cache flush request. The processor groups the multiple blocks of data into a single composite block of data, and compresses the composite block of data. The processor stores the compressed composite block of data, and stores metadata for the compressed composite block of data. The metadata includes information for both the composite block of data and information for each of the multiple blocks of data.

20 Claims, 7 Drawing Sheets

US 11,507,292 B2

SYSTEM AND METHOD TO UTILIZE A COMPOSITE BLOCK OF DATA DURING COMPRESSION OF DATA BLOCKS OF FIXED SIZE

FIELD OF THE DISCLOSURE

This disclosure generally relates to information handling systems, and more particularly relates to improving compression ratios by utilizing a composite block of data during compression of data blocks of fixed size.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a storage device to store a compressed block of data, and a processor. The processor may identify multiple blocks of data within an address space of a memory device. The processor may group the multiple blocks of data into a single composite block of data, and compress the composite block of data. The processor may store the compressed composite block of data in the storage device. The processor may store metadata for the compressed composite block of data. The metadata includes information for both the composite block of data and information for each of block of the multiple blocks of data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
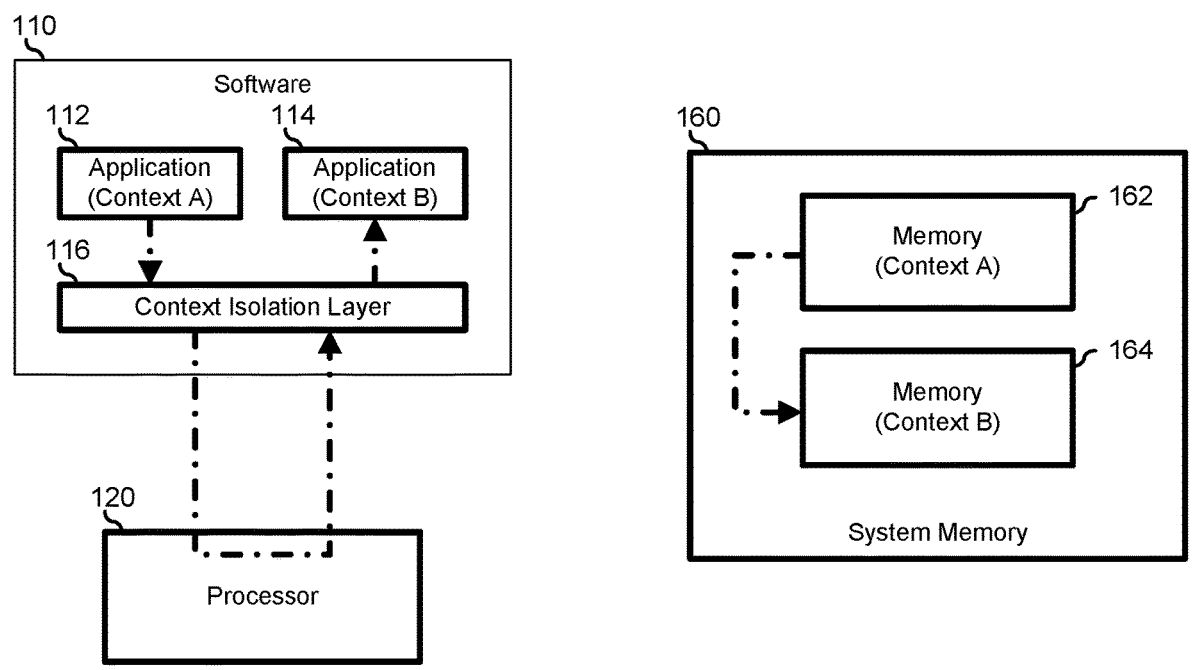
FIG. 1 is a block diagram of an information handling system according to the prior art.

FIG. 1 illustrates an information handling system 100 that utilizes a data exchange architecture in accordance with the prior art. Information handling system 100 includes software 110, a processor 120, and a system memory 160. Software 110 represents machine-executable code stored on information handling system 100 that is executable by processor 120, and includes a first application 112 that is associated with a first context, a second application 114 that is associated with a second context, and a context isolation layer 116. Application 112 is associated with one or more address ranges in the system physical address space (SPA) provided by system memory 160. The address ranges associated with application 112 are collectively shown as a portion 162 of system memory 160. Similarly, application 114 is associated with one or more address ranges in system memory 160, collectively shown as a portion 164 of the system memory. Context isolation layer 116 represents one or more agent, application program interface (API), utility, or the like that operates to maintain the isolation between memory 162 and 164. Examples of context isolation layer 116 may include a system Basic Input/Output System (BIOS) or Universal Extensible Firmware Interface (UEFI), hereinafter referred to collectively as "BIOS," that operates to provide isolated memory ranges for system operations, a virtual desktop system that isolates various memory ranges for the use of multiple users of the virtual desktop system, a hypervisor or virtual machine manager (VMM) that sets up and maintains virtual machines and their associated memory ranges, or the like.

In operation, when applications 112 and 114 are instantiated on information handling system 100, context isolation layer 116 allocates memory 162 and 164 to the use of their respective applications. In addition, when applications 112 and 114 need to interact, for example by moving data from one application to the other, context isolation layer 116 operates to manage the transfer of data between memory 162 and 164.

Note here that the data exchange architecture of information handling system 100 requires the execution of code associated with context isolation layer 116 by processor 120 in order to perform data transfers between memory 162 and memory 164. As such, the prior art data exchange architecture imposes a processing burden on processor 120, thereby reducing the processor cycles available for performing other tasks associated with applications 112 and 114. It will be understood that this processing overhead may be partially mitigated by the inclusion of Direct Memory Access (DMA) hardware in information handling system 100. However, it will be further understood that such DMA hardware is typically a vendor specific add-on, and access to such DMA hardware by applications 112 and 114 directly is typically difficult. In particular, even with the inclusion of DMA hardware, processor 120 is still needed to set up DMA transfers, and context isolation layer 116 is still needed in its role as gatekeeper to system memory 160.

Figure 2:
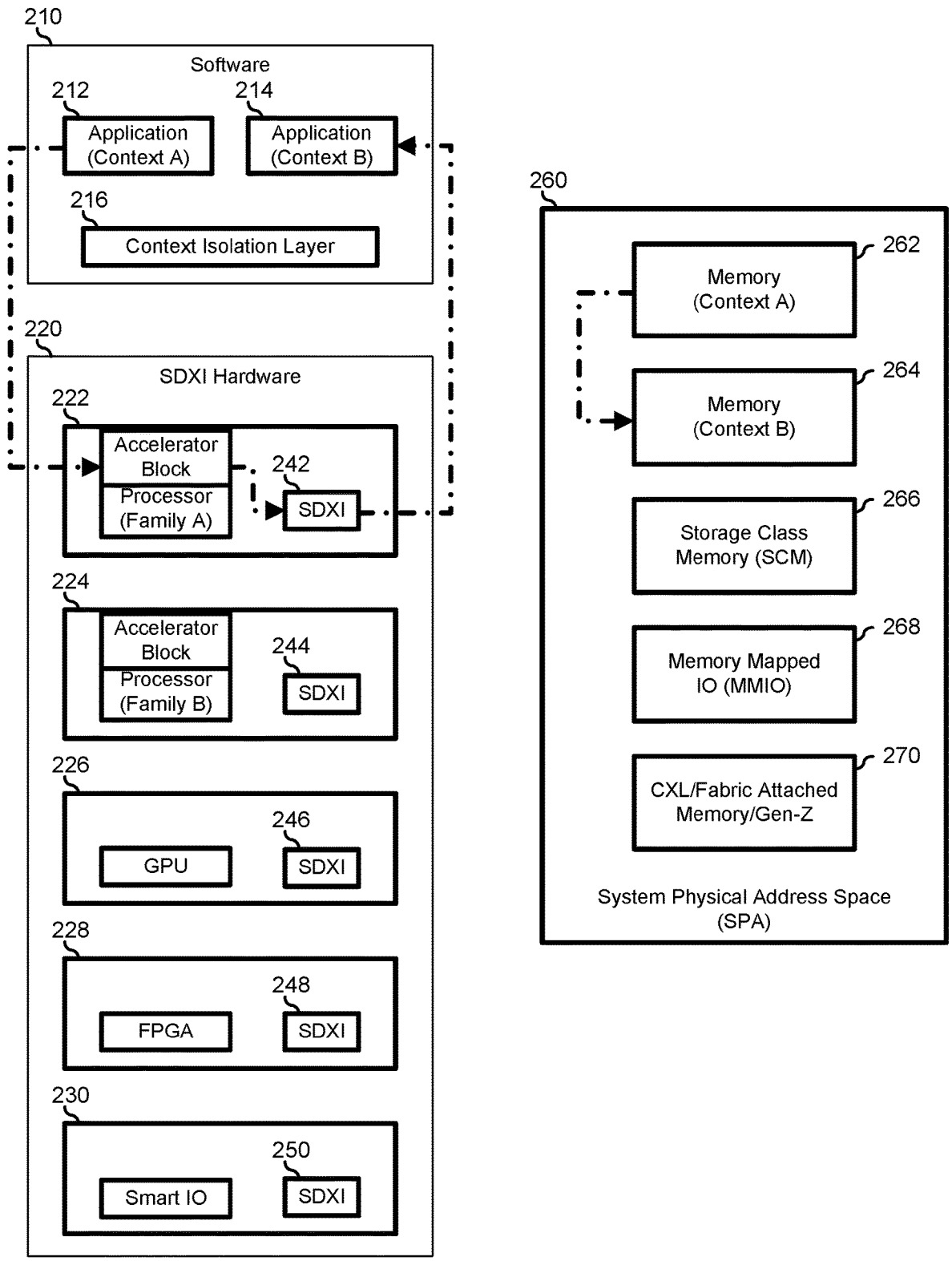
FIG. 2 is a block diagram of an information handling system according to an embodiment of the current disclosure.

FIG. 2 illustrates an information handling system 200 that utilizes a Smart Data Accelerator Interface (SDXI) data exchange architecture in accordance with an embodiment of the current disclosure. Information handling system 200 includes software 210, SDXI hardware 220, and a system physical address space (SPA) 260. SDXI hardware 220 includes a first family of processors 222 and an associated SDXI interface 242, a second family of processors 224 and an associated SDXI interface 244, one or more Graphics Processor Unit (GPU) 226 and an associated SDXI interface 246, a Field-Programmable Gate Array (FPGA) 248 and an associated SDXI interface 248, and a Smart I/O device 230 and an associated SDXI interface 250. Software 210 is similar to software 110, and represents machine-executable code stored on information handling system 200 that is executable by a processor such as one or more of processors 222 and 224. Software 210 includes a first application 212 that is associated with a first context, a second application 214 that is associated with a second context, and a context isolation layer 216. Software 210 may include functions and features similar to software 110, as described above. In particular, software 210 may implement the data exchange architecture of information handling system 100, as needed or desired. As such, application 212 is associated with one or more address ranges in SPA 260, with the associated address ranges shown as a portion 262 of the SPA, and application 214 is associated with one or more address ranges in the SPA, with the associated address ranges shown as a portion 264 in the SPA. Here too, context isolation layer 216 is similar to context isolation layer 116, representing one or more agent, API, utility, or the like that operates to maintain the isolation between memory 262 and 264. As such, context isolation layer 216 operates to allocate memory 262 and memory 264 when respective application 212 and application 214 are instantiated on information handling system 200, and the context isolation layer prevents the use of various memory ranges by unauthorized applications.

The SDXI data exchange architecture represents an industry effort to expand and standardize data movement protocols and hardware accelerator interfaces. As such, information handling system 200 broadens the scope of data exchanges on both the hardware side and the memory side. In particular, on the hardware side, SDXI hardware 220 incorporates various types of processing elements, co-processors, accelerators, and other data movers, as typified by processor families 222 and 224, GPU 226, FPGA 228, and Smart I/O device 230. On the memory side, SPA 260 is expanded to include not only the system physical memory, as typified by memory 262 and memory 264, but also separately attached memory, such as Storage Class Memory (SCM) devices 266, memory mapped I/O (MMIO) devices 268, and memory architectures, such as Compute Express Link (CXL) and Gen-Z memory interfaces, fabric-attached memory, and the like, as shown collectively as memory device 270. In particular, the SDXI data exchange architecture treats all of memory devices 262, 264, 266, 268, and 270 as a single SPA 260. The SDXI data exchange architecture then provides standardized interfaces for data movement between software 210, SDXI hardware 220, and SPA 260. Here, SDXI interfaces 242, 244, 246, 248, and 250 represent hardware and software associated with their respective hardware devices, such that a common set of SDXI commands, instructions, procedures, calls, and the like, referred to hereinafter as "SDXI commands," can be made to the hardware devices. Here, the details of implementing the various SDXI commands can be left to the design requirements and desires of the various hardware manufacturers. In this way, the SDXI data exchange architecture remains extensible and forward-compatible with new hardware or memory developments, and is independent of actual data movement details, data acceleration implementations, and the underlying I/O interconnect technology. The SDXI commands support: data movement between different address spaces including user address spaces located within different virtual machines; data movement without mediation by privileged software once a connection has been established; an interface and architecture that can be abstracted or virtualized by privileged software to allow greater compatibility of workloads or virtual machines across different servers; a well-defined capability to quiesce, suspend, and resume the architectural state of a per-address-space data mover to allow "live" workload or virtual machine migration between servers; mechanisms to enable forwards and backwards compatibility across future specification revisions, allowing software and hardware designed to different specification revisions to interoperate; the ability to incorporate additional offloads in the future leveraging the architectural interface; and a concurrent DMA model. As used herein, SDXI will be understood to represent any present or future specifications, specification revisions, articles, working papers, or other publications of the Smart Data Accelerator Interface (SDXI) Technical Working Group (TWG) of the Storage Networking Industry Association (SNIA).

Figure 3:
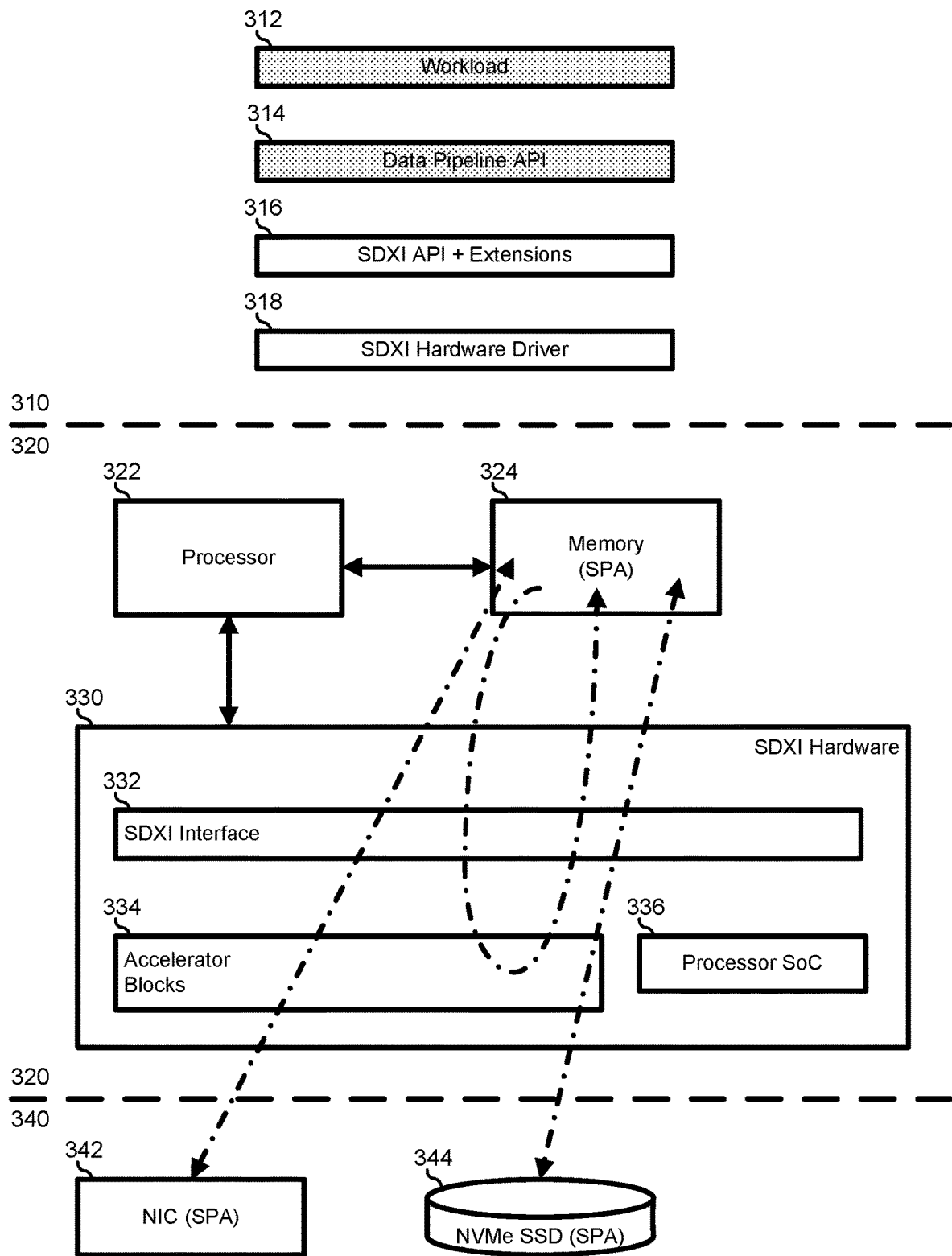
FIG. 3 is a block diagram of an information handling system according to another embodiment of the current disclosure.

FIG. 3 illustrates an embodiment of an information handling system 300 similar to information handling system 200. Information handling system 300 includes a software layer 310, a hardware layer 320, and an attachment layer 340. Software layer 310 is similar to software 210, and includes a workload 312, a data pipeline API 314, a SDXI API 316, and a SDXI hardware driver 318. Hardware layer 320 includes a processor 322, a memory (SPA) 324, and a SDXI hardware device 330. Attachment layer 340 includes a Network Interface Card (NIC) 342 and a Non-Volatile Memory—Express (NVMe) Solid State Drive (SSD) 344. NIC 342 and SSD 344 are each extensions of the SPA space of information handling system 300.

Workload 312 and data pipeline API 314 operate similarly to applications 212 and 214, and context isolation layer 216, and represent elements of a typical information handling system that perform the processing task of the information handling system. In particular, workload 312 operates to perform various operations on data and to move data between different storage and processing elements of information handling system 300, and may make various service calls to data pipeline API to assist in such processing operations and data moves. SDXI API 316 represents an API configured to provide the core operability as specified by a particular revision of an SDXI specification. In addition, SDXI API 316 provides additional extensions to the core operability of the particular SDXI specification, as described below. When workload 312 or data pipeline API 314 invoke SDXI API 316 for the various data operations or data moves, the SDXI API operates to direct SDXI hardware driver 318 elicit SDXI hardware 330 to perform one or more of the invoked operations or data moves, as needed or desired. In this regard, SDXI hardware driver 318 and SDXI hardware 330 are closely associated with each other.

As such, SDXI hardware 330 represents a wide variety of different types of hardware that can be utilized to perform the SDXI core operations and extensions as described herein. An example of SDXI hardware 330 may include accelerator blocks within a general purpose processor or processor family, such as a CPU or the like, a purpose specific processor, such as a GPU or the like, a logic-based device or state-based device, such as a FPGA, a Complex Programmable Logic Device (CPLD) or the like, a smart I/O device that provides in-line data processing in the course of I/O operations, such as a smart NIC, a Host Bus Adapter (HBA), a storage controller such as a RAID controller, a Network Attached Storage (NAS) device, a Storage Area Network (SAN) controller, or the like, or another processing device, as needed or desired. Here, it will be understood that, SDXI hardware 330 may be configured to provide operations consistent with its type, but that are not specifically associated with its SDXI functionality. For example, where SDXI hardware 330 represents a FPGA type of device, it will be understood that the FPGA device may be invoked to provide functionality of a more general nature, in addition to the SDXI functionality as described herein.

SDXI hardware 330 includes a SDXI interface 332, various accelerator blocks 334, and a processor SoC 336. Accelerator blocks 334 may represent hardware accelerators, logic-based or state-based accelerators, or other configurable or pre-configured accelerator functions, as needed or desired. As described further below, SDXI hardware 330 may operate in some embodiments to provide enhanced data pipelining operations. For example, SDXI hardware 330 may provide data movement: between different locations in memory 324, to and from the memory and a network connected to NIC 342, to and from the memory and NVMe SSD 344, to and from the network and the NVMe SSD, and between different locations in the NVME SSD. SDXI hardware 330 may further operate in some embodiments to provide enhanced data transformation operations on data, either as atomic operations or in conjunction with the data movement utilizing various accelerator blocks 334. In particular, various embodiments of SDXI hardware 330 may provide: data compression/decompression, data encryption/decryption, data checksums, hash functions such as SHA-256 hashes and the like, RAID functions, erasure coding, and the like. Other functions that may be performed by SDXI hardware 330 may include data deduplication, LZ-4 compression, compression ratio and block size optimization, data operation chaining, multi-point data movement, uncompressible block handling, and query analytics.

Figure 4:
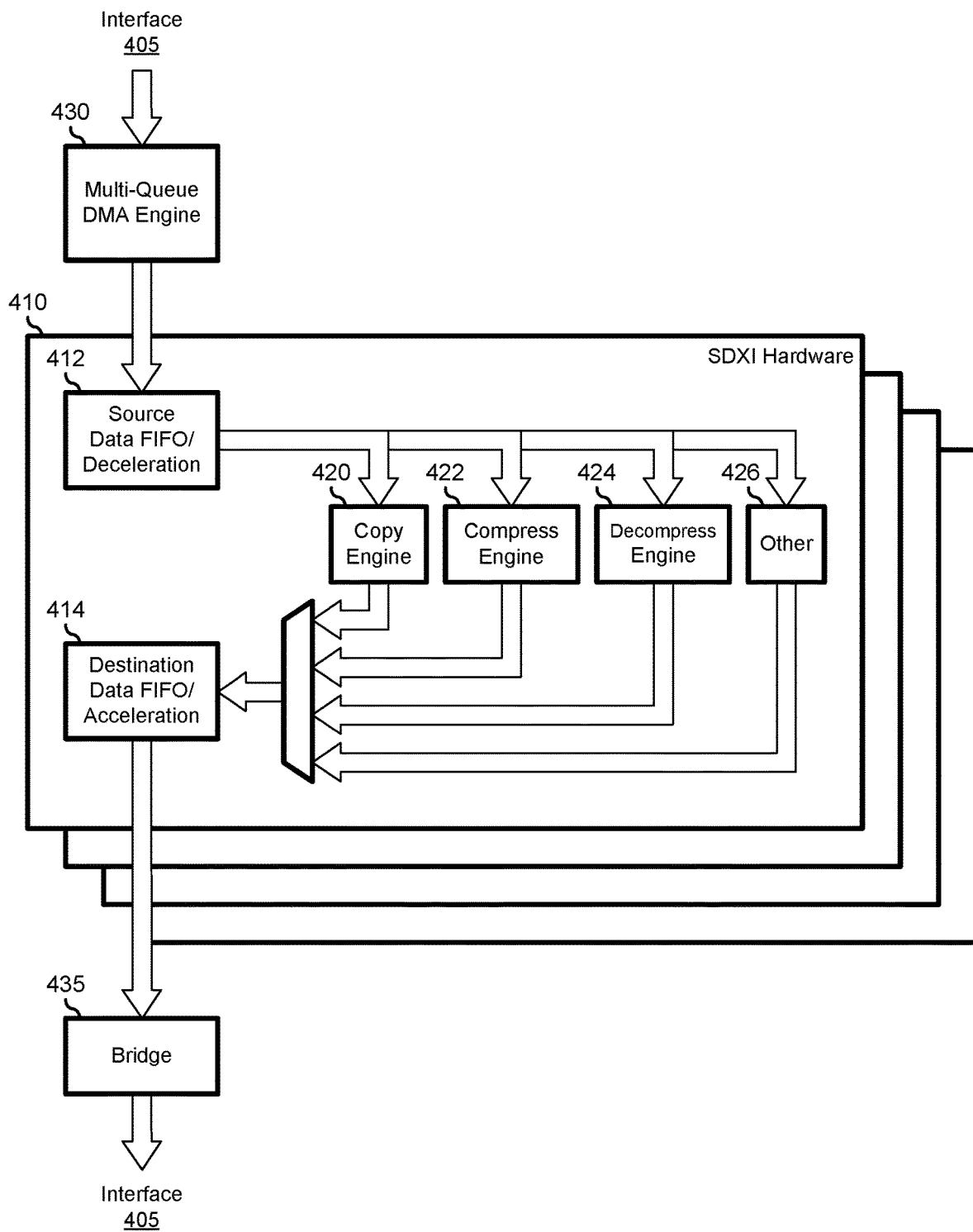
FIG. 4 is a block diagram of a portion of an information handling system according to another embodiment of the current disclosure.

FIG. 4 illustrates an embodiment of an information handling system 400 similar to information handling systems 200, 200 and 300. Information handling system 400 includes a processor complex (not illustrated) that provides a communication interface 405 to provide data communications with multiple SDXI hardware devices 410. An example of interface 405 may include a Third Generation Peripheral Component Interconnect—Express (PCIe Gen3) ×16 (16-lane) communication link, a PCIe Gen3 communication link with greater or fewer lanes (e.g., ×4, ×8, ×32), or another communication interface, as needed or desired. Information handling system 400 further includes a multi-queue Direct Memory Access (DMA) engine 430, and a data bridge 435. Each of the SDXI hardware devices 410 are connected to receive data and instructions from DMA engine 430, and to provide data and control information to data bridge 435. DMA engine 430 provides dynamic allocation of parallel data flows to the multiple SDXI hardware devices 410, as needed by the processing tasks operating on information handling system 400. The data flows are provided to DMA engine 430 via interface 405, and may be received from memory or storage devices within the SPA of information handling system 400. Data bridge 435 receives the data flows from SDXI hardware devices 410 and communicates the data flows via interface 405 to the memory and storage devices within the SPA of information handling system 400.

Each of the SDXI hardware devices 410 may be understood to be similar hardware devices, such as where the SDXI hardware devices are each provided by a common manufacturer and are a common device type. Here, DMA engine 430 may allocate data flows to the various SDXI hardware devices 410 based upon factors unrelated to the particular device type of the SDXI hardware devices. For example, DMA engine 430 may allocate data flows based upon the resource loading or availability of each of the SDXI hardware devices, the power level or power state of each of the SDXI hardware devices, or other factors not directly related to the type of the SDXI hardware devices, as needed or desired. Further, each of SDXI hardware devices 410 may be understood to be different hardware devices, such as where the SDXI hardware devices are provided by different manufacturers and are different device types. Here, DMA engine 430 may allocate data flows to the various SDXI hardware devices 410 based upon the type of each of the SDXI hardware devices. For example, where a particular SDXI hardware device 410 contains a network function, DMA engine 430 may allocate network based data flows to that particular SDXI function. On the other hand, where a different SDXI hardware device contains a storage controller function, DMA engine 430 may allocate storage based data flows to the other SDXI function.

SDXI hardware device 410 is illustrated as including a source data FIFO/deceleration module 412, a destination data FIFO/acceleration module 414, a copy engine 420, a compression engine 422, a decompression engine 424, and one or more additional engines 426. The configuration illustrated by SDXI hardware device 410 will be understood to be typical, and representative of a wide range of device configurations, as needed or desired. As such, the particular configuration illustrated by SDXI hardware device 410 should not be understood to be limiting on the type, nature, features, configuration, or functionality of SDXI hardware devices in general. Other functions that may be performed by SDXI hardware 410 may include data deduplication, LZ-4 compression, compression ratio and block size optimization, data operation chaining, multi-point data movement, uncompressible block handling, and query analytics.

Figure 5:
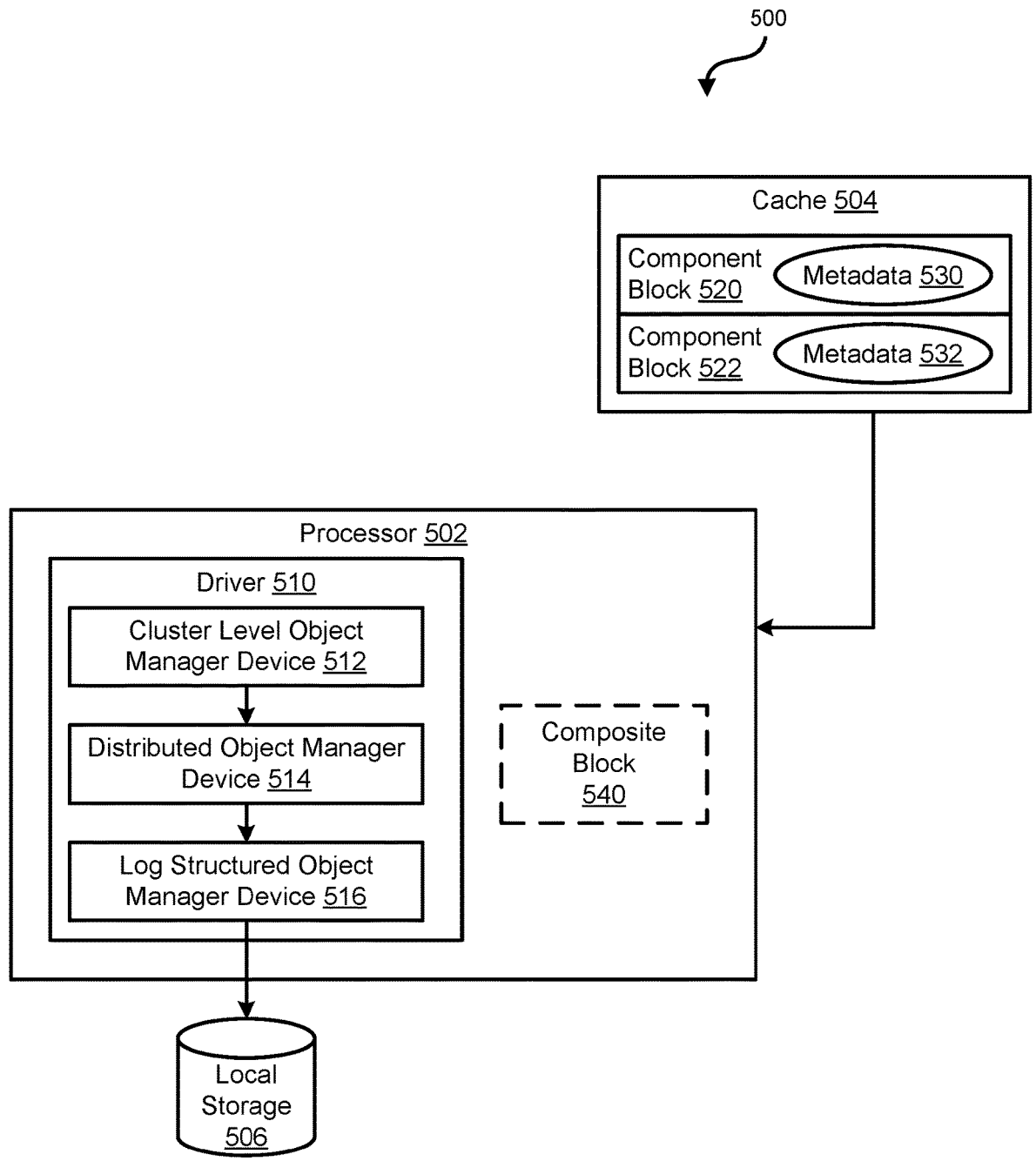
FIG. 5 is a block diagram of a portion of an information handling system according to another embodiment of the current disclosure.

FIG. 5 illustrates a portion of an information handling system 500 similar to information handling systems 200, 300, and 400 according to an embodiment of the current disclosure. Information handling system 500 may be suitable device including, but not limited to, a distributed storage array. Information handling system 500 includes a processor 502, a cache 504, and a local storage device 506. In different examples, cache 504 may be incorporated within the same physical chip as processor 502 or may be a separate component of information handling system 500 as shown in FIG. 5. As used and described herein cache 504 may be broadly interpreted as any suitable memory device to store data associated with processor 502 and anything component of information handling system 500. Processor 502 includes a driver 510, which in turn includes a cluster level object manager device 512, a distributed object manager device 514, and a log structured object manager device 516. Cache 504 may store component blocks 520 and 522, as well as metadata 530 and 532. Although only data blocks 520 and 522 are shown in FIG. 5, cache 504 may store any suitable number of data blocks without varying from the scope of the disclosure. One of ordinary skill in the art would recognize that information handling system 500 may include addition components without varying from the scope of this disclosure.

During operation, one or more components, such as processor 502, within information handling system 500 may provide one or more data transfers between memory spaces. In an example, the data transfers may be between any suitable memory spaces including, but not limited to, memory spaces in different contexts, such as in between different virtual machines. The data transfers may be complaint with any suitable protocol or hardware, such as an SDXI hardware device. Information handling system 500 may provide any suitable accelerator operation as a transform for the data being transferred. In an example, the accelerator operation may be any suitable operation including, but not limited to, data compression, encryption, cyclic redundancy check (CRC) calculation, erasure code offloads, and hash calculations for deduplication.

In previous information handling systems, compression operations were performed on a storage unit size block of data. For example, in a distributed storage array device, the storage unit size may be 4 Kbyte. In certain examples, small blocks of data may have compression ratios that are less than compression ratios for compression of an entire file containing the same data blocks due to less data history within the small blocks to search for matches. In certain information handling systems, such as a distributed storage array, a compression policy may be to discard compression results if a compression ratio for a block of data is not equal to or greater than a particular threshold including, but not limited to, 40%, 50%, and 60. For example, if a bock of data is X KBytes the compressed data may be discarded if the compressed data is not ½X KBytes or less. Processor 502 may improve information handling system 500 by grouping or combining multiple blocks of data within cache 504 and compress the composite block of data to achieve higher compression ratios as compared to possible compression ratios of a single block of data. Therefore, if information handling system 500 is a distributed storage array, the higher compression ratios may enable a higher percentage of blocks of data being stored in a compressed format within local storage device 506.

In an example, processor 502 may receive a flush command for cache 504. In certain examples, cache 504 may be any suitable cache of processor 502 including, but not limited to, a write cache of the processor. In an example, the flush command may include a command to write one or more blocks of data, such as component blocks 520 and 522, from cache 504 to local storage device 506.

In response to the flush command, processor 502, via driver 510, may perform one or more suitable operations to compile data blocks 520 and 522 into a single composite block of data. For example, driver 510 may retrieve multiple blocks of data from cache 504. In an example, the multiple blocks may be any suitable number of data blocks including, but not limited to, component blocks of data 520 and 522 within cache 504. In certain examples, each block of data 520 and 522 within cache 504 may be substantially the same size. In an example, data blocks 520 and 522 may be any suitable blocks of data within cache 504 including, but not limited to, contiguous blocks of data. In response to retrieving the multiple blocks of data, including blocks 520 and 522, driver 510 may compile the blocks of data into a single composite block of data 540. In an example, composite block 540 may be formed from any suitable number of blocks of data including, but not limited to, components blocks 520 and 522.

Driver 510 may perform one or more suitable operations to compress composite block 540. In an example, if data blocks 520 and 522 both include a first number of descriptors for data, then a concatenated or composite block 540 may include a chain of descriptors substantially equal to the sum of the descriptors of both of the data blocks. In an example, cluster level object manager device 512 concatenate blocks 520 and 522 and store the metadata for the concatenated data block or composite block 540. Based on the chain of descriptors, distributed object manager device 514 may utilize compression history for data blocks 520 and 522 to match searches to better compress composite 540. In this example, distributed object device 514 may perform the compression operations within processor 502. In previous information handling systems, the compression of blocks of data would be performed by log structured object manager device 516. Thus, information handling system 500 performs data compression in distributed object manager 514 which is a higher level object manager as compared to log structured object manager device 516. In an example, information handling system 500 may be a distributed file system and treat composite block 540 as a compression entity.

In response to composite block 540 being compressed, the compressed composite data block may be stored in local storage device 506. In an example, local storage device 506 may be utilized for any suitable data storage including, but not limited to, a permanent data storage device. In certain examples, metadata 530 for data block 520 and metadata 532 for data block 522 may also be stored in local storage device 506. In an example, metadata 530 and 532 for may include dependencies of individual blocks 520 and 522 on composite block 540. In certain examples, the metadata association between individual blocks or component blocks 520 and 522 of parent composite block 540 may be utilized by processor 502 for compression of the composite block.

In an example, distributed object manager device 512 may use destination addresses in local storage device 506 to write the compressed data. Processor 502 may determine a number of data buffers needed to write out the compressed data of composite block 540 based on the size of the compressed data block. In an example, the compressed data may be read from local storage device 506 in any substantial manner including, but not limited to, an application layer reading the compressed data in any similar manner as any other compressed data.

Figure 6:
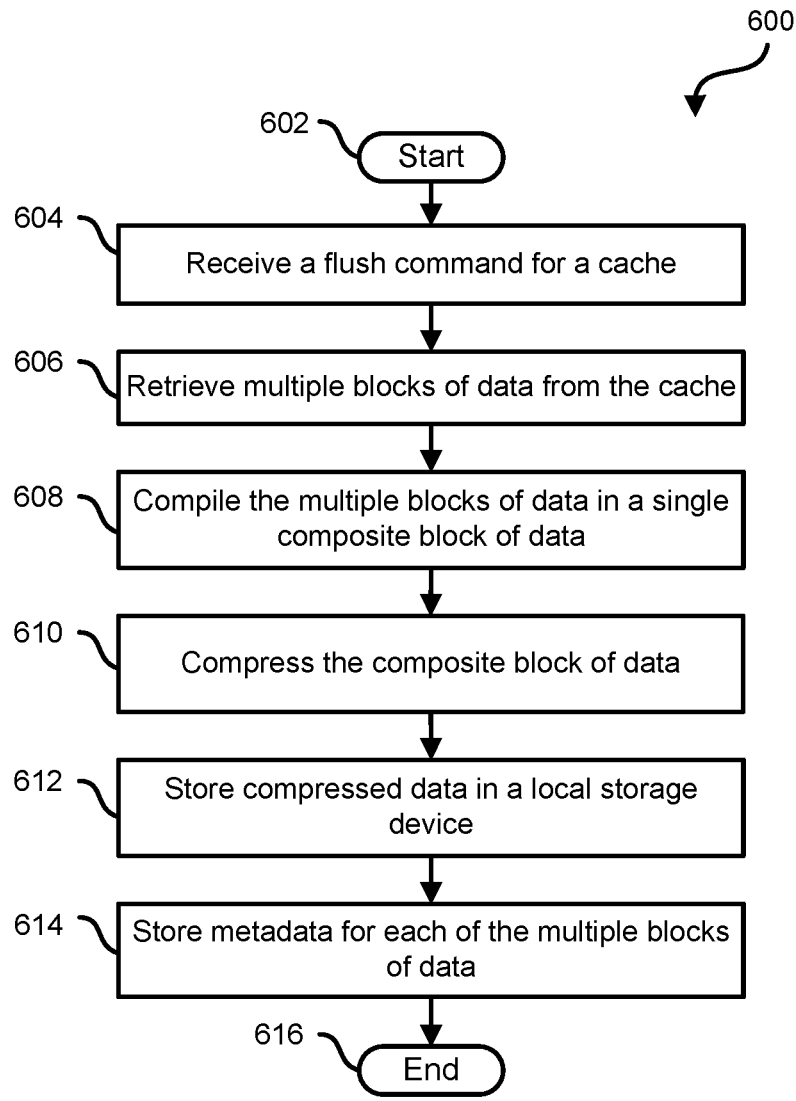
FIG. 6 is a flow diagram of a method for utilizing a composite block of data during compression of data blocks of fixed size according to another embodiment of the current disclosure.

FIG. 6 is a flow diagram of a method 600 for utilizing a composite block of data during compression of data blocks of fixed size according to another embodiment of the current disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 100 depicted in FIG. 1, information handling system 500 depicted in FIG. 5, or any other type of system, controller, device, module, processor, or any combination thereof, operable to employ all, or portions of, the method of FIG. 6.

At block 604, a flush to persistence command for a cache is received. In an example, the cache may be any suitable cache of a processor including, but not limited to, a write cache of the processor. In certain examples, the flush command may include a command to write one or more blocks of data from the cache to a permanent storage device.

At block 606, multiple blocks of data are retrieved from the cache. In an example, the multiple blocks may be any suitable number of data blocks within the cache. In certain examples, each block of data within the cache may be substantially the same size. For example, each of the blocks of data may be 4 Kbyte. In certain examples, the multiple blocks of data may be any suitable blocks of data including, but not limited to, contiguous blocks of data. In an example, a driver of a processor may retrieve the multiple blocks of data.

At block 608, the multiple blocks of data are compiled into a single composite block of data. In an example, the composite block of data may be formed from any suitable number of blocks of data to create a composite block of data that may result in a higher level of compression as compared to each of the original blocks of data within the cache. For example, the composite block may include a chain descriptor including descriptors from each of the multiple blocks, and the chain descriptor may improve the compression ratios based on histories of each of the multiple blocks.

At block 610, the composite block of data is compressed. In an example, any suitable component within a processor may perform the compression of the composite block. For example, an accelerator within the processor may compress the composite block. In certain examples, a distributed object device may perform the compression operations within the accelerator of the processor. At block 612, the compressed composite data block is stored in a local storage device. In an example, the local storage device may be utilized for any suitable data storage including, but not limited to, permanent data storage. At block 614, metadata for each of the multiple blocks of data is stored, and the method ends at block 616. In an example, the metadata for the individual data blocks within the composite data block may include dependencies of the individual blocks on the composite block. In certain examples, the metadata association between the individual blocks or component blocks of a parent composite block may be utilized by the processor for compression of the composite block. Decompression of a composite block will require retrieval of all blocks that compose the composite block.

Figure 7:
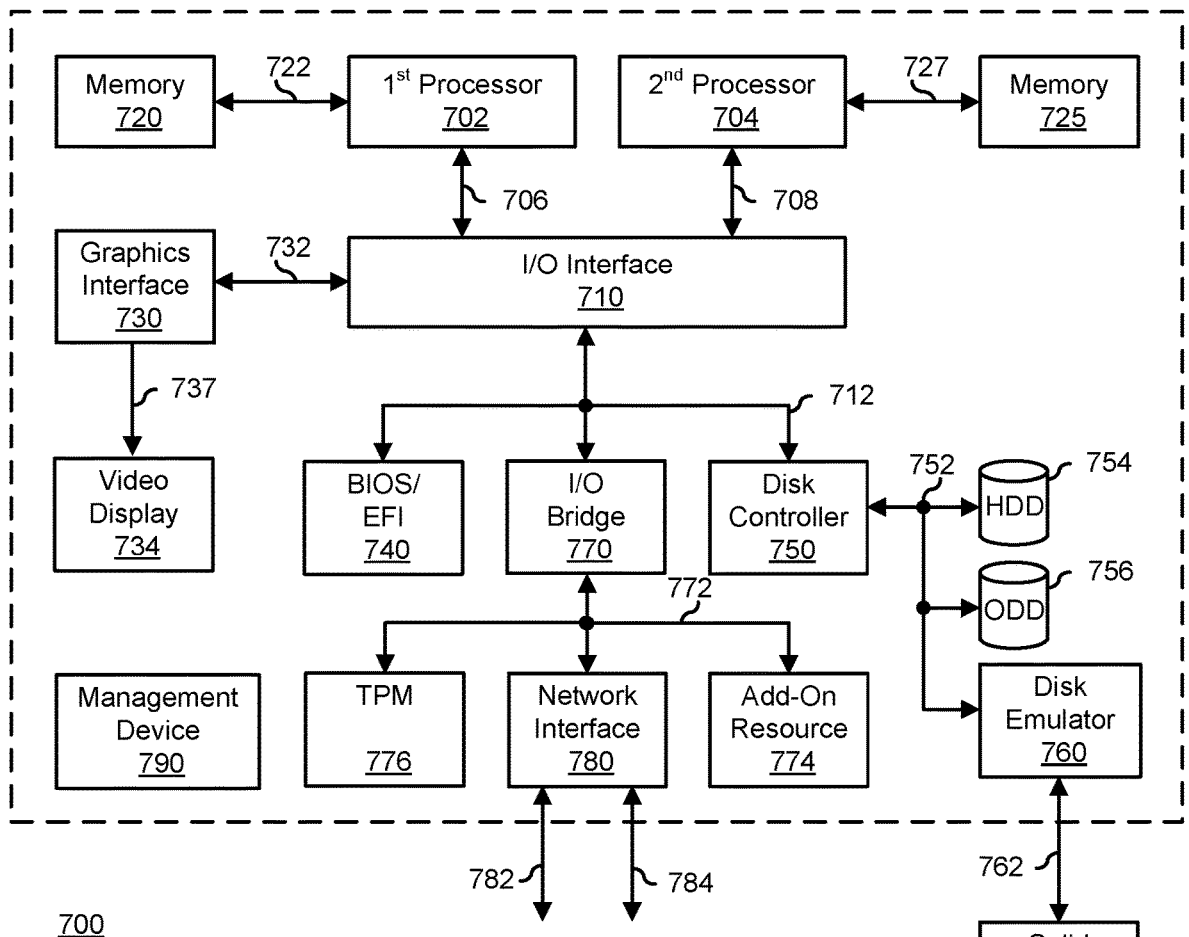
FIG. 7 is a block diagram illustrating a generalized information handling system according to another embodiment of the present disclosure.

FIG. 7 illustrates a generalized embodiment of an information handling system 700. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below, and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732, and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712, or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700. Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a storage device to store a compressed block of data; and
   a processor to communicate with the storage device, the processor to:

in response to a flush command, identify multiple blocks of data within an address space of a memory device associated with the flush command, wherein a size of each of the multiple blocks of data is equal to a storage unit size block of data for the memory device;

group the multiple blocks of data into a single composite block of data;

compress the composite block of data, wherein a first compression ratio for the single composite block of data is greater than a second compression ratio for a single block of the multiple blocks of data;

store the compressed composite block of data in the storage device; and store metadata for the compressed composite block of data, wherein the metadata includes information for both the composite block of data and information for each block of the multiple blocks of data.

2. The information handling system of claim 1, wherein the processor includes a driver to retrieve the multiple blocks of data, and to perform the compression of the composite block of data.

3. The information handling system of claim 2, wherein the identification of the multiple blocks includes the driver to analyze metadata of each of blocks of data in the memory device, to determine similarities in the metadata of each of the multiple blocks of data, and based on the similarities, identify the multiple blocks of data as blocks of data for the composite block of data.

4. The information handling system of claim 3, wherein a size of each of the blocks of data in the memory device are the same.

5. The information handling system of claim 4, wherein a size of the composite block of data varies based on a number of blocks of data identified as the multiple blocks of data.

6. The information handling system of claim 1, wherein first metadata for a first block of the multiple blocks includes dependencies on other blocks of the multiple blocks.

7. The information handling system of claim 1, wherein the compression of the composite block of data is performed by a distributed object manager of the processor.

8. The information handling system of claim 1, wherein the multiple blocks of data are contiguous blocks of data within the memory device.

9. A method comprising:

in response to a flush command, identifying, by a processor, multiple blocks of data within an address space of a memory device associated with the flush command, wherein a size of each of the multiple blocks of data is equal to a storage unit size block of data for the memory device;

grouping the multiple blocks of data into a single composite block of data;

compressing the composite block of data, wherein a first compression ratio for the single composite block of data is greater than a second compression ratio for a single block of the multiple blocks of data;

storing the compressed composite block of data in a storage device of an information handling system; and storing metadata for the compressed composite block of data, wherein the metadata includes information for both the composite block of data and information for each of the multiple blocks of data.

10. The method of claim 9, the method further comprising:

retrieving, by a driver of the processor, the multiple blocks of data; and performing, by the driver, the compression of the composite block of data.

11. The method of claim 10, wherein the identifying of the multiple blocks includes:

analyzing, by the driver, metadata of each of blocks of data in the memory device;

determining similarities in the metadata of each of the multiple blocks of data; and based on the similarities, identifying the multiple blocks of data as blocks of data for the composite block of data.

12. The method of claim 11, wherein a size of each of the blocks of data in the memory device are the same.

13. The method of claim 12, wherein a size of the composite block of data varies based on a number of blocks of data identified as the multiple blocks of data.

14. The method of claim 9, wherein first metadata for a first block of the multiple blocks includes dependencies on other blocks of the multiple blocks.

15. The method of claim 9, wherein the compressing of the composite block of data is performed by a distributed object manager of the processor.

16. The method of claim 9, wherein the multiple blocks of data are contiguous blocks of data within the memory device.

17. A non-transitory computer-readable medium including code that when executed performs a method, the method comprising:

in response to a flush command, identifying multiple blocks of data within an address space of a memory device associated with the flush command, wherein a size of each of the multiple blocks of data is equal to a storage unit size block of data for the memory device;

grouping the multiple blocks of data into a single composite block of data;

compressing the composite block of data, wherein a first compression ratio for the single composite block of data is greater than a second compression ratio for a single block of the multiple blocks of data;

storing the compressed composite block of data in a storage device of the information handling system; and storing metadata for the compressed composite block of data, wherein the metadata includes information for both the composite block of data and information for each of the multiple blocks of data.

18. The non-transitory computer-readable medium of claim 17, wherein the method further comprises:

retrieving the multiple blocks of data; and performing the compression of the composite block of data.

19. The non-transitory computer-readable medium of claim 18, wherein the method further comprises:

analyzing metadata of each of blocks of data in the memory device;

determining similarities in the metadata of each of the multiple blocks of data; and based on the similarities, identifying the multiple blocks of data as blocks of data for the composite block of data.

20. The non-transitory computer-readable medium of claim 17, wherein the multiple blocks of data are contiguous blocks of data within the memory device.

* * * * *